No. 612,709. Patented Oct. 18, 1898.
W. E. DECROW.
ELECTRIC SIGNALING APPARATUS.
(Application filed Jan. 4, 1898.)
(No Model.)
Fig. 1.
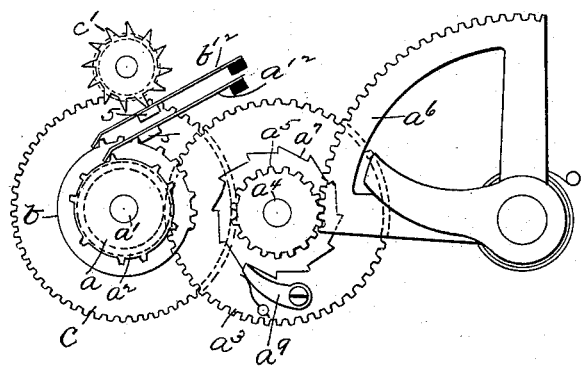
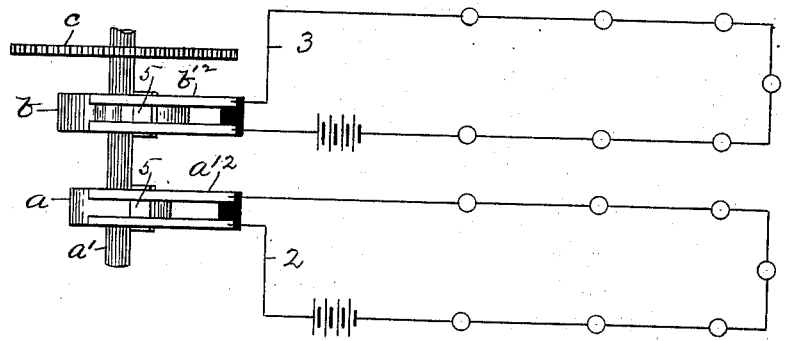
Fig. 2.
Witnesses:
Inventor:
William E. Decrow

UNITED STATES PATENT OFFICE.

WILLIAM E. DECROW, OF BOSTON, MASSACHUSETTS, ASSIGNOR TO THE GAMEWELL FIRE-ALARM TELEGRAPH COMPANY, OF NEW YORK, N. Y.

ELECTRIC SIGNALING APPARATUS.

SPECIFICATION forming part of Letters Patent No. 612,709, dated October 18, 1898.

Application filed January 4, 1898. Serial No. 665,541. (No model.)

*To all whom it may concern:*

Be it known that I, WILLIAM E. DECROW, of Boston, county of Suffolk, State of Massachusetts, have invented an Improvement in Electric Signaling Apparatus, of which the following description, in connection with the accompanying drawings, is a specfiication, like letters and numerals on the drawings representing like parts.

In fire-alarm signaling it has been customary to send fast and slow signals from headquarters to the fire-stations, said fast and slow signals being transmitted over different circuits, and small gongs and other quickly-responsive electric apparatus are connected with the circuits over which the fast signals are transmitted, and large gongs, tower-bell strikers, &c., which are more or less slow in action, are connected with the circuits over which the slow signals are transmitted. Usually the fast signals are first transmitted, followed by the slow signals, and to accomplish this result two independent transmitters are ordinarily employed, one for transmitting the fast signals and the other for transmitting the slow signals, each transmitter being separately set and operated. An improvement in this mode of transmitting the signals from headquarters to the fire-stations forms the subject-matter of my application, Serial No. 663,520, to which reference may be had. In my said application a signal-transmitter is shown whereby a signal is transmitted at different speeds at every operation—as, for instance, fast and slow—and the signal when transmitted fast is termed the "fast" signal and when transmitted slow is termed the "slow" signal, and said fast and slow signals are transmitted over circuits provided for them, and said transmitter is so constructed and arranged that said fast and slow signals are transmitted successively, first the fast signal and then the slow signal being transmitted.

This invention has for its object to improve the construction of a variable-speed signal-transmitter adapted to transmit a signal at different speeds at every operation, to the end that said signals may be simultaneously transmitted over their respective circuits.

The invention therefore consists in an electric signal-transmitter constructed and arranged to simultaneously transmit a signal at different speeds at every operation; also, in a signal-transmitter constructed and arranged to transmit two or more rounds of a signal at different speeds at every operation; also, in a signal-transmitter constructed and arranged to simultaneously transmit a fast and a slow signal at every operation; also, in a signal-transmitter having signal-wheels or equivalent devices insulated from each other and constructed and arranged to simultaneously transmit their signals; also, in an electric signal-transmitter having two signal-wheels or equivalent devices adapted to simultaneously transmit their signals, a train for operating them, and an actuating-lever; also, in an electric signal-transmitter having two signal-wheels or equivalent transmitting devices adapted to simultaneously transmit their respective signals at different speeds, a train for operating them, and an actuating-lever; also, in the combination, with such a signal-transmitting device, of a number of circuits corresponding to the number of signals which are simultaneously transmitted.

Figure 1 shows a sufficient portion of a signal-transmitter embodying this invention to illustrate the same, and Fig. 2 a plan view of the signal-wheels and a diagram of the circuit.

$a$ $b$ represent two break-wheels secured to a shaft $a'$, which has secured to it a pinion $a^2$, (see dotted lines, Fig. 1,) which is engaged by a toothed wheel $a^3$, secured to a shaft $a^4$, upon which is loosely mounted a pinion $a^5$, which is engaged and operated by a spring-actuated sector $a^6$, and $a^7$ is a ratchet-wheel connected with said pinion $a^5$, which engages a pawl $a^9$, carried by the toothed wheel $a^3$. A toothed wheel $c$ is secured to the shaft $a'$, which engages a pinion secured to a shaft carrying an escape-wheel $c'$.

The break-wheels $a$ and $b$ each have coöperating with them contact-pens $a^{12}$ $b^{12}$, which are connected, respectively, with circuits 2 3, one of which, as 2, includes any number of slow-acting receiving instruments and the other of which, as 3, includes any number of quick-acting receiving instruments.

The two break-wheels, or "signal-wheels," as they are commonly called, are designed to transmit the same signal, the box number 12 being herein represented, and the signal-wheel $a$, it will be seen, is constructed to transmit three rounds of the signal on each complete revolution of the wheel, and as three rounds is the number usually considered sufficient said wheel may be caused to make one complete revolution at each operation of the transmitter. The signal-wheel $b$ will also make one complete revolution at each operation of the box, as it is secured to the same shaft to which the signal-wheel $a$ is secured; but it will be observed that the signal 12 on said wheel has its three rounds arranged on one-third of the periphery of said wheel, so that while the shaft $a'$ is making one-third of a revolution, and thereby transmitting one round of the signal 12 by the signal-wheel $a$, said signal will be transmitted three rounds by the signal-wheel $b$.

The two pairs of contact-pens $a^{12}$ $b^{12}$ are herein represented as secured to blocks 4 of insulating material and to normally rest upon conducting-blocks 5, so that the circuits are normally closed, and the signal-wheels $a$ $b$ are made of insulating material, or their teeth may be composed of insulating material, and therefore they will operate to break the circuit when the teeth lift the pens off of the conducting-blocks; but such form of circuit-breaker is well known in the art.

It will be seen that the signal 12 is herein shown as transmitted simultaneously at two different speeds—fast over the circuit 3 and slow over the circuit 2—and that there will be three rounds of the fast signal and three rounds of the slow signal transmitted.

It is obvious that many ways may be devised for constructing a signal-transmitter which is adapted to carry out the essential features of this invention, and therefore I do not desire to limit my invention to the particular construction herein shown.

I claim—

1. An electric signal-transmitter comprising a train, two signal-transmitting devices constructed and arranged to transmit their signals at different speeds at each operation of the train, and an actuating-lever for said train, substantially as described.

2. An electric signal-transmitter comprising a train, two signal-transmitting devices constructed and arranged to simultaneously transmit their signals at different speeds at each operation of the train, and an actuating-lever for said train, substantially as described.

3. An electric signal-transmitter comprising a train, two signal-transmitting devices constructed and arranged to transmit two or more rounds at different speeds at each operation of the train, and an actuating-lever for said train, substantially as described.

4. In an electric signaling apparatus, a signal-transmitter comprising two signal-transmitting devices constructed and arranged to simultaneously transmit their signals at different speeds, a train for operating said signal-wheels, and an actuating-lever for said train, and two circuits operated respectively by said signal-transmitting devices, substantially as described.

5. An electric signal-transmitter comprising a train, two signal-wheels operated by it at the same speed but adapted to transmit their respective signals at different speeds and an actuating-lever for said train, substantially as described.

In testimony whereof I have signed my name to this specification in the presence of two subscribing witnesses.

WILLIAM E. DECROW.

Witnesses:
B. J. NOYES,
H. B. DAVIS.